(12) United States Patent
Vijaykumar

(10) Patent No.: US 12,461,129 B2
(45) Date of Patent: Nov. 4, 2025

(54) SYSTEMS AND METHODS FOR GALVANIC INTERFACE BOND DETECTION FOR INVERTER FOR ELECTRIC VEHICLE

(71) Applicant: BorgWarner US Technologies LLC, Wilmington, DE (US)

(72) Inventor: Srikanth Vijaykumar, Carmel, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 170 days.

(21) Appl. No.: 18/456,769

(22) Filed: Aug. 28, 2023

(65) Prior Publication Data

US 2025/0076347 A1   Mar. 6, 2025

(51) Int. Cl.
| | |
|---|---|
| *G01R 19/00* | (2006.01) |
| *G01R 19/10* | (2006.01) |
| *G01R 19/165* | (2006.01) |
| *H02P 27/06* | (2006.01) |

(52) U.S. Cl.
CPC ......... *G01R 19/0038* (2013.01); *G01R 19/10* (2013.01); *G01R 19/1659* (2013.01); *H02P 27/06* (2013.01)

(58) Field of Classification Search
CPC ............................... G06F 9/3005; G06F 9/541
See application file for complete search history.

(56) References Cited

U.S. PATENT DOCUMENTS

| | | |
|---|---|---|
| 4,599,578 A | 7/1986 | Seevinck |
| 4,748,652 A | 5/1988 | Nagai et al. |
| 6,812,553 B2 | 11/2004 | Gerbsch et al. |
| 6,943,293 B1 | 9/2005 | Jeter et al. |
| 7,095,098 B2 | 8/2006 | Gerbsch et al. |
| 7,229,855 B2 | 6/2007 | Murphy |
| 7,295,433 B2 | 11/2007 | Taylor et al. |
| 7,538,425 B2 | 5/2009 | Myers et al. |
| 7,551,439 B2 | 6/2009 | Peugh et al. |
| 11,190,031 B2 * | 11/2021 | Narla ....................... H02J 9/061 |
| 11,718,190 B1 * | 8/2023 | Zarabadi ................. B60R 16/02 307/10.1 |
| 2013/0235955 A1 | 9/2013 | Xu et al. |

(Continued)

FOREIGN PATENT DOCUMENTS

CN   113691275 B   7/2023

*Primary Examiner* — Jermele M Hollington
*Assistant Examiner* — Zannatul Ferdous
(74) *Attorney, Agent, or Firm* — Joshua M. Haines; Bookoff McAndrews, PLLC

(57) ABSTRACT

A system includes an inverter including: a first galvanic isolator separating a primary voltage area from a secondary voltage area; a second galvanic isolator separating the primary voltage area from the secondary voltage area; a first bias network in the secondary voltage area, and connected to the first galvanic isolator; a second bias network in the secondary voltage area, and connected to the second galvanic isolator; a first amplifier in the secondary voltage area, and connected to the first bias network; a second amplifier in the secondary voltage area, and connected to the second bias network; and an open connection detector in the secondary voltage area, the open connection detector connected to the first amplifier and connected to the second amplifier, wherein the open connection detector includes one or more voltage-to-current converters.

18 Claims, 9 Drawing Sheets

(56) References Cited

U.S. PATENT DOCUMENTS

2019/0326956 A1* 10/2019 Balasubramanian .... H04B 5/45
2019/0379270 A1    12/2019 Pullen et al.
2021/0203183 A1*  7/2021 Lin ........................ H02M 7/537
2022/0131406 A1*  4/2022 Ho ............................ H02J 7/02

* cited by examiner

SYSTEMS AND METHODS FOR GALVANIC INTERFACE BOND DETECTION FOR INVERTER FOR ELECTRIC VEHICLE

TECHNICAL FIELD

Various embodiments of the present disclosure relate generally to systems and methods for an open bond wire detector for a galvanic interface for an inverter for an electric vehicle, and, more particularly, to systems and methods for an open bond wire detector for a galvanic interface for a power module for an inverter for an electric vehicle.

BACKGROUND

Inverters, such as those used to drive a motor in an electric vehicle, for example, are responsible for converting High Voltage Direct Current (HVDC) into Alternating Current (AC) to drive the motor. In an inverter, connection issues across a galvanic interface may affect an operation of a gate driver and/or power device switches, and therefore may affect an operation of the inverter.

The present disclosure is directed to overcoming one or more of these above-referenced challenges.

SUMMARY OF THE DISCLOSURE

In some aspects, the techniques described herein relate to a system including: an inverter configured to convert DC power from a battery to AC power, wherein the inverter includes: a first galvanic isolator separating a primary voltage area from a secondary voltage area, the first galvanic isolator having a first galvanic isolator output path; a second galvanic isolator separating the primary voltage area from the secondary voltage area, the second galvanic isolator having a second galvanic isolator output path; a first bias network in the secondary voltage area, and connected to the first galvanic isolator via the first galvanic isolator output path, the first bias network having a first bias network output path; a second bias network in the secondary voltage area, and connected to the second galvanic isolator via the second galvanic isolator output path, the second bias network having a second bias network output path; a first amplifier in the secondary voltage area, and connected to the first bias network via the first bias network output path, the first amplifier having a first amplifier output path; a second amplifier in the secondary voltage area, and connected to the second bias network via the second bias network output path, the second amplifier having a second amplifier output path; and an open connection detector in the secondary voltage area, the open connection detector connected to the first amplifier via the first amplifier output path and connected to the second amplifier via the second amplifier output path, wherein the open connection detector includes one or more voltage-to-current converters.

In some aspects, the techniques described herein relate to a system, further including: a pulse transceiver in the primary voltage area, the pulse transceiver connected to the first galvanic isolator via a first pulse transceiver output path and connected to the second galvanic isolator via a second pulse transceiver output path.

In some aspects, the techniques described herein relate to a system, further including a main receiver.

In some aspects, the techniques described herein relate to a system, wherein the pulse transceiver and the main receiver are configured to operate together to transmit a Pulse Width Modulation signal from the primary voltage area to the secondary voltage area.

In some aspects, the techniques described herein relate to a system, wherein the pulse transceiver is configured to output a first pulse on the first pulse transceiver output path and a second pulse on the second pulse transceiver output path.

In some aspects, the techniques described herein relate to a system, wherein the pulse transceiver is further configured to receive a primary pulse, and output the first pulse and the second pulse, based on the received primary pulse.

In some aspects, the techniques described herein relate to a system, wherein: the first galvanic isolator is configured to receive the first pulse on the first pulse transceiver output path, and send a first galvanic isolator pulse on the first galvanic isolator output path based on the received first pulse, and the second galvanic isolator is configured to receive the second pulse on the second pulse transceiver output path, and send a second galvanic isolator pulse on the second galvanic isolator output path based on the received second pulse.

In some aspects, the techniques described herein relate to a system, wherein: the first bias network is configured to receive the first galvanic isolator pulse on the first galvanic isolator output path, process the first galvanic isolator pulse based on one or more properties of the first bias network, and send a first biased pulse on the first bias network output path based on the processed first galvanic isolator pulse, and the second bias network is configured to receive the second galvanic isolator pulse on the second galvanic isolator output path, process the second galvanic isolator pulse based on one or more properties of the second bias network, and send a second biased pulse on the second bias network output path based on the processed second galvanic isolator pulse.

In some aspects, the techniques described herein relate to a system, wherein the open connection detector includes: a first peak detector connected to the first amplifier via the first amplifier output path, the first peak detector having a first peak detector output path, and a second peak detector connected to the second amplifier via the second amplifier output path, the second peak detector having a second peak detector output path.

In some aspects, the techniques described herein relate to a system, wherein the one or more voltage-to-current converters includes: a first voltage-to-current converter connected to the first peak detector via the first peak detector output path, the first voltage-to-current converter having a first voltage-to-current converter output path, and a second voltage-to-current converter connected to the second peak detector via the second peak detector output path, the second voltage-to-current converter having a second voltage-to-current converter output path.

In some aspects, the techniques described herein relate to a system, wherein the open connection detector further includes: a first difference detector connected to the first voltage-to-current converter via the first voltage-to-current converter output path, the first difference detector having a first difference detector output path, and a second difference detector connected to the second difference detector via the second difference detector output path, the second difference detector having a second difference detector output path.

In some aspects, the techniques described herein relate to a system, wherein the open connection detector is configured to: receive a first amplified signal via the first amplifier output path; receive a second amplified signal via the second amplifier output path; perform a comparison of the first amplified signal and the second amplified signal, with one or more of each other or one or more reference signals; and initiate a mitigation action based on the comparison of the first amplified signal and the second amplified signal.

In some aspects, the techniques described herein relate to a system, wherein the mitigation action includes asserting a fault signal.

In some aspects, the techniques described herein relate to a system, further including: the battery configured to supply the DC power to the inverter; and a motor configured to receive the AC power from the inverter to drive the motor.

In some aspects, the techniques described herein relate to a method including: receiving, by one or more controllers, a first pulse, and transmitting, by the one or more controllers, a first galvanic isolator pulse based on the first pulse; receiving, by the one or more controllers, a second pulse, and transmitting by the one or more controllers, a second galvanic isolator pulse based on the second pulse; receiving, by the one or more controllers, the first galvanic isolator pulse and the second galvanic isolator pulse and transmitting by the one or more controllers, a first biased pulse based on the first galvanic isolator pulse and a second biased pulse based on the second galvanic isolator pulse; receiving, by the one or more controllers, the first biased pulse and the second biased pulse and transmitting by the one or more controllers, a first amplified pulse based on the first biased pulse and a second amplified pulse based on the second biased pulse; detecting, by the one or more controllers, a first peak of the first amplified pulse and a second peak of the second amplified pulse; generating, by the one or more controllers, a difference between the detected first peak of the first amplified pulse and the detected second peak of the second amplified pulse; comparing, by the one or more controllers, the difference with a threshold current reference; and generating, by the one or more controllers, an output pulse based on the comparing.

In some aspects, the techniques described herein relate to a method, wherein the generating the difference includes: subtracting the detected second peak of the second amplified pulse from the detected first peak of the first amplified pulse, as a first difference; and subtracting the detected first peak of the first amplified pulse from the detected second peak of the second amplified pulse, as a second difference.

In some aspects, the techniques described herein relate to a method, wherein the generating the difference further includes: converting the detected first peak of the first amplified pulse from a voltage signal to a current signal; converting the detected second peak of the second amplified pulse from a voltage signal to a current signal; subtracting the converted second peak of the second amplified pulse from the converted first peak of the first amplified pulse, as the first difference; and subtracting the converted first peak of the first amplified pulse from the converted second peak of the second amplified pulse, as the second difference.

In some aspects, the techniques described herein relate to a method, wherein the comparing the difference with the threshold current reference includes: determining whether the first difference is greater than the threshold current reference; and determining whether the second difference is greater than the threshold current reference.

In some aspects, the techniques described herein relate to a method, wherein the generating the output pulse includes: generating an open bond wire for the second galvanic isolator pulse when the first difference is determined to be greater than the threshold current reference, and generating an open bond wire for the first galvanic isolator pulse when the second difference is determined to be greater than the threshold current reference.

In some aspects, the techniques described herein relate to a system including: a first galvanic isolator configured to receive a first pulse from a pulse transceiver and output a first galvanic isolator pulse based on the received first pulse; a second galvanic isolator configured to receive a second pulse from the pulse transceiver and generate a second galvanic isolator pulse based on the received second pulse; and one or more controllers configured to: receive the first galvanic isolator pulse and the second galvanic isolator pulse as a first voltage signal and a second voltage signal, convert the first voltage signal and the second voltage signal to a first current signal and a second current signal, perform a comparison of the first current signal and the second current signal, with one or more of each other or one or more reference signals, and determine a fault in one or more of the first galvanic isolator or the second galvanic isolator based on the comparison.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
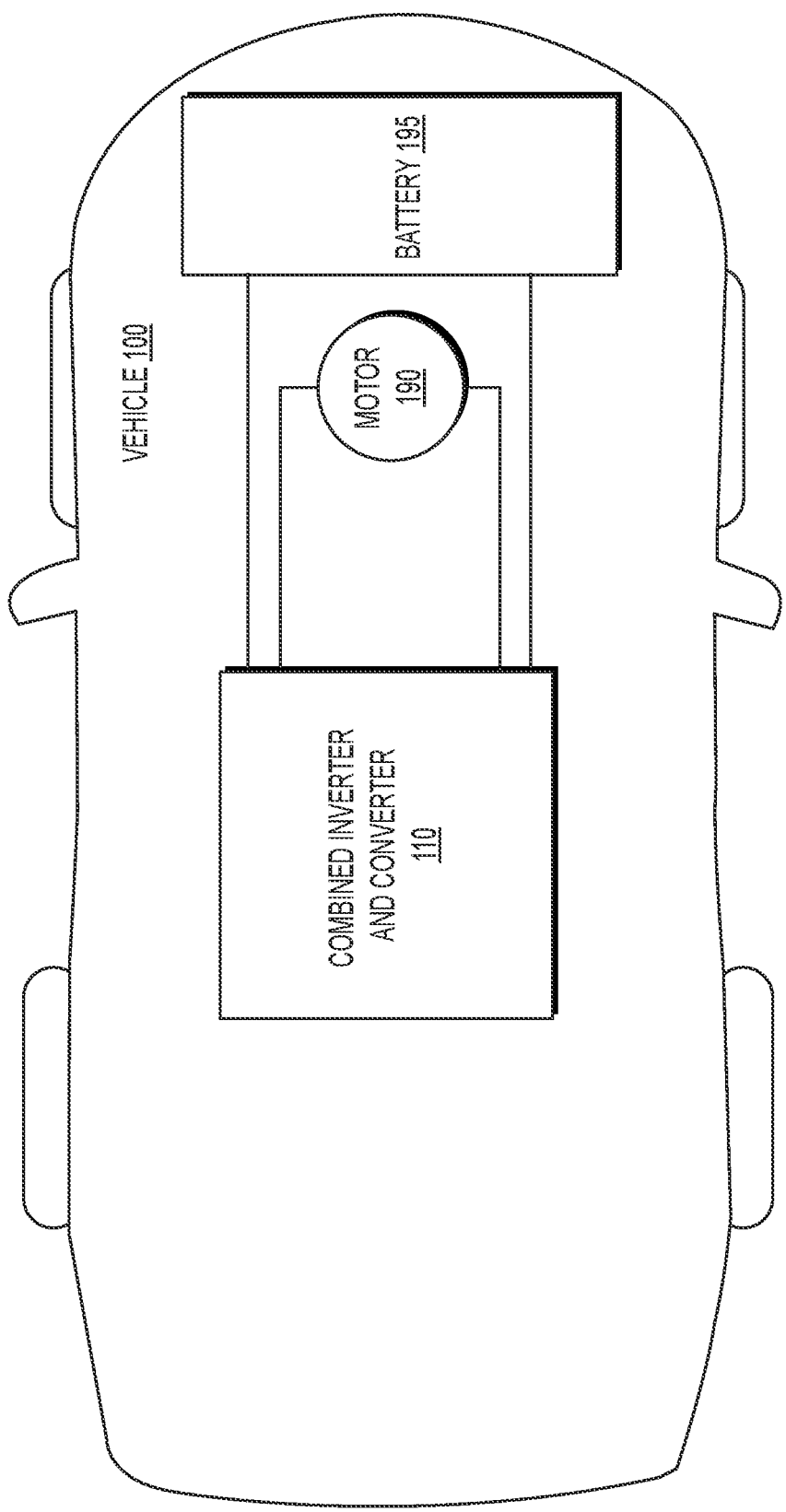
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems and methods for an open bond wire detector for a galvanic interface for an inverter for an electric vehicle, and, more particularly, to systems and methods for an open bond wire detector for a galvanic interface for a power module for an inverter for an electric vehicle.

Inverters, such as those used to drive a motor in an electric vehicle, for example, are responsible for converting High Voltage Direct Current (HVDC) into Alternating Current (AC) to drive the motor. A three phase inverter may include a bridge with six power device switches (for example, power transistors such as IGBT or MOSFET) that are controlled by Pulse Width Modulation (PWM) signals generated by a controller. An inverter may include three phase switches to control the phase voltage, upper and lower gate drivers to control the switches, a PWM controller, and glue logic between the PWM controller and the gate drivers. The PWM controller may generate signals to define the intended states of the system. The gate drivers may send the signals from the PWM controller to the phase switches. The phase switches may drive the phase voltage. The inverter may include an isolation barrier between low voltage and high voltage planes. Signals may pass from the PWM controller to the phase switches by passing across the isolation barrier, which may employ optical, transformer-based, or capacitance-based isolation. PWM signals may be distorted when passing through the glue logic, which may include resistive, capacitive, or other types of filtering. PWM signals may be distorted when passing through the gate driver, due to the galvanic isolation barrier and other delays within the gate driver. PWM signals may be distorted when the signals processed by the phase switch via the gate driver output.

Gate drivers may tolerate common-mode transients that occur during field-effect transistor (FET) switching and when one side of the floating high voltage terminal is shorted to ground or subject to an electro-static discharge. These voltage transients may result in fast edges, which may create bursts of common-mode current through the galvanic isolation. A gate driver may need to demonstrate common-mode transient immunity (CMTI) in order to be effective and safe.

Gate drivers may have a high-voltage domain in common to the voltage plane of an associated FET. Further, high-voltage planes may be supplied by a flyback converter that may be isolated through a transformer from the low-voltage plane. The high-voltage domain supply may be used to power circuits which source and sink gate current to drive the FET and which may detect FET faults so the faults can be acted upon and/or communicated to the low-voltage domain. Gate drivers may include a galvanic channel dedicated to FET commands, and one or more bidirectional or unidirectional galvanic channels dedicated to FET communications.

High current switching transients may create strong electro-magnetic (EM) fields that may couple into nearby metal traces. The magnitude and frequency of coupled currents may depend upon the layout of the FET packaging solution and the direction and length of metal traces between the FET and the control integrated circuit (IC). For example, typical values for coupled currents may be up to 1 A at AC frequencies up to 100 MHz. Typically, within a circuit, the gate driver IC may be placed far enough away from the FET that high EM fields do not couple directly into the internal metal traces within the gate driver IC. The gate driver is placed a distance from EM fields such that induced currents within the circuitry are below levels that will cause malfunction of the gate driver, or a metal shield is placed between the gate driver and the source of EM fields to protect the gate driver circuitry. The output terminals of the gate driver that connect to the FET are exposed to the EM fields at the point where the output terminals are no longer covered by a shield. The gate driver switches large currents (such as 5 A to 15 A, for example) through these exposed terminals. The switched large currents are generally greater in magnitude than the EM-induced currents. The gate driver is able to overdrive the induced currents to maintain control of the FETs. The high side of the gate drivers and the FET may share a common ground and a gate control signal trace, both of which may be susceptible to coupled currents.

Gate drivers may turn on low-resistance switches to source and sink gate currents. Series resistors may sometimes be added to limit gate current. Switched gate currents may be larger than coupled currents in order to maintain control of their respective FETs.

Gate drivers may be able to sense FET operating voltages or currents in order to provide feedback and react to faults. Over-current faults may typically be detected by sensing the FET drain to source voltage and comparing the sensed voltage to a reference value. Sensed voltages may be heavily filtered to reject coupled currents. Filtering may slow down the response to fault conditions, resulting in delays in response. For example, the rate of current increase due to a low resistance short circuit may reach damaging levels prior to being detected by the heavily filtered drain to source voltage detection strategy. The resulting short circuit may damage the FET or the vehicle, prior to being detected and shut off.

According to one or more embodiments, a FET driver circuit may provide rapid over-current detection by either shunt current sensing or by diverting a fraction of the load current through a parallel FET that may have a current sensing circuit. Utilizing either strategy may require a "point-of-use IC" where sensing circuitry is in close proximity to the FET. Even if a point-of-use IC and a remote controller are resistant to EM fields, communication between the point-of-use IC and remote controller remains susceptible to induced currents. Point-of-use ICs have been implemented in low EM field applications, such as smart FETs for automotive applications. However, point-of-use ICs have not been used in high EM field applications. A high EM field may be a field (i) that induces a current within an IC that is in excess of an operating current of the IC and leads to malfunction, or (ii) that induces a differential voltage within an IC which is in excess of the operating differential voltage and leads to malfunction. A high EM field may be a field that is greater than approximately 10 A or approximately 100V, for example.

As introduced above, galvanic isolation may include isolating functional sections of electrical systems to prevent current flow such that, for example, no direct conduction path is permitted between such functional sections. For example, two circuits may be galvanically isolated such that the circuits are configured to communicate with each other, but may have respective reference grounds at different potentials. For example, some architectures use a circuit with four galvanic isolators, such as four capacitors, for transferring data between low voltage and high voltage planes. The galvanic isolation may include optical, transformer-based, or capacitance-based isolation, for example.

A gate driver may be a power amplifier or other electrical component that accepts an input from a controller, and may generate a drive input for the gate of a transistor. Galvanically isolated gate drivers may be used in automotive and industrial applications for communication between low voltage and high voltage planes, without causing harm to users or equipment.

One or more embodiments may include bond wires that connect the output of a low voltage controller to a high voltage controller across a galvanic isolator. Bond wires may include conductive material including, but not limited to, aluminum, copper, silver, gold, an alloy of the same, or a combination thereof. Bond wires may be connected to a circuit using any applicable manner, such as ball bonding, wedge bonding, or compliant bonding, for example.

One or more bond wires may connect a low voltage side transmitter of an integrated circuit to one or more capacitors at a high voltage side of a circuit, such as an integrated circuit, for example. An open bond wire may result in a loss of the differential nature of a given galvanic interface. Such a loss of the differential nature may render the galvanic interface and/or the gate drive integrated circuit more susceptible to interference (e.g., electromagnetic interference). For example, such interference may include common mode radio frequency (RF) noise (CMRFI).

Interference (e.g., electromagnetic interference, CMRFI, etc.) may result in propagation of incorrect commands and/or messages to gate drivers. For example, as a result of interference, a high voltage controller may receive and/or apply incorrect commands and/or messages from a low voltage controller. Such incorrect commands and/or messages may increase the risk of a short between a high side controller or driver and a low side controller or driver.

Some galvanic isolation integrated circuits may determine wire bond detection using an initial pulse (e.g., a heartbeat signal) through a signal path during initiation of a circuit, or by comparing the waveforms between a transmitter and receiver to determine the integrity of a given signal path. However, such initial pulses or waveform comparisons may result in a delay between a wire bond issue and the detection of the wire bond issue. Such delays may result in interference causing incorrect commands and/or messages to be propagated. Depending on a design of gate drive circuitry at a system level, this delay in determining a fault could prove catastrophic.

Some circuit architectures may use a differential pair tied together using a resistor network for biasing. This architecture may result in coupling of common mode (CM) noise into an open high voltage capacitor terminal, making the architecture incapable of detecting a bond connection issue (e.g., an open bond wire) during a CM noise event. Some architectures may use a separate galvanic capacitor for transmitting the carrier frequency. This may be used for detecting an open bond wire, but this architecture requires an additional high voltage galvanic capacitor, which uses additional area in a circuit.

One or more embodiments may include an amplifier that amplifies an attenuated signal so that there is a discernable difference between two inputs when one of the bond wires is open. The amplified signal may be passed through a peak detector which holds the peak of the signal for a duration of time. The held output of the peak detector may be passed through a low pass filter to obtain a smooth output voltage with respect to the open bond wire voltage signal. The voltage output of the peak detector may be converted to current (V>I) with two V>I converters.

When the bond wires are intact, the two V>I converters should produce approximately the same current at a respective output. In practice, a mismatch in devices between the two V>I converters may result in slightly different outputs. The two current outputs may be subtracted from each other. For example, a current from a channel A V>I converter may be subtracted from a channel B V>I converter and vice-versa. When the two current outputs from the V>I converters are similar, the subtracted currents may be very small. These subtracted currents may be compared against a threshold reference current, which may be a configurable parameter.

When one of the bond wires is open, there may be a significant difference in the current between the two V>I converters, and hence the subtracted current may also be significant. This subtracted current may be compared against the threshold reference current. This comparison may result in asserting an output of the current comparator, indicating an open bond wire.

One or more embodiments may provide a bias network for a receiver, with placement of an open capacitor detection circuit before the main receiver, which may increase an immunity of the circuit to common mode RF noise coupling. One or more embodiments may provide a system to detect an open bond wire during mission mode in the presence of CMRFI, which may provide a faster fault response time. One or more embodiments may provide a system that may use significantly less circuit area, and may not require a special test procedure or mode to detect the integrity of a bond wire.

FIG. 1 depicts an exemplary system infrastructure for a vehicle including a combined inverter and converter, according to one or more embodiments. In the context of this disclosure, the combined inverter and converter may be referred to as an inverter. As shown in FIG. 1, electric vehicle 100 may include an inverter 110, a motor 190, and a battery 195. The inverter 110 may include components to receive electrical power from an external source and output electrical power to charge battery 195 of electric vehicle 100. The inverter 110 may convert DC power from battery 195 in electric vehicle 100 to AC power, to drive motor 190 of the electric vehicle 100, for example, but the embodiments are not limited thereto. The inverter 110 may be bidirectional, and may convert DC power to AC power, or convert AC power to DC power, such as during regenerative braking, for example. Inverter 110 may be a three-phase inverter, a single-phase inverter, or a multi-phase inverter.

Figure 2:
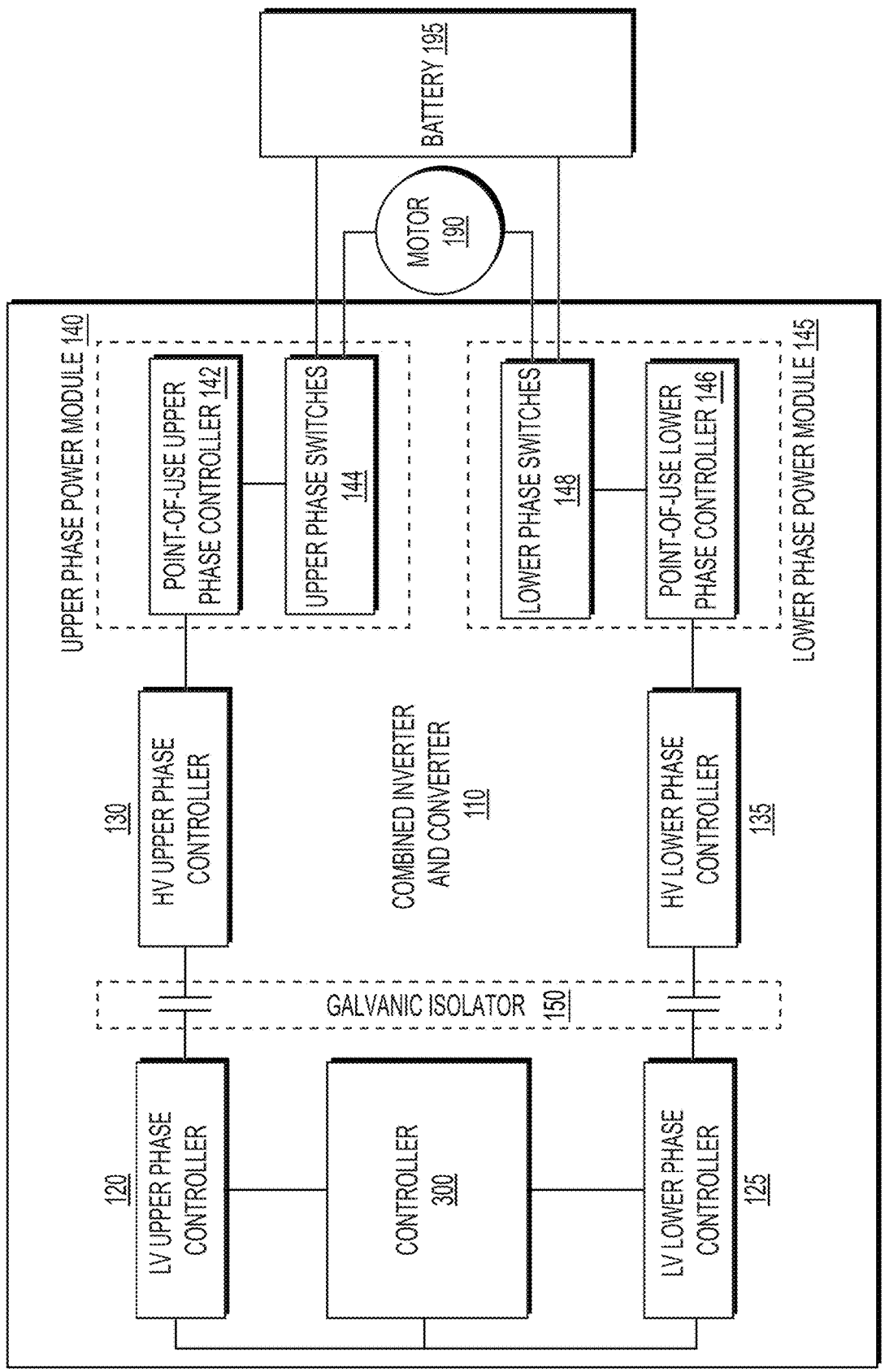
FIG. 2 depicts an exemplary system infrastructure for the combined inverter and converter of FIG. 1 with a point-of-use switch controller, according to one or more embodiments.

FIG. 2 depicts an exemplary system infrastructure for the inverter 110 of FIG. 1 with a point-of-use switch controller, according to one or more embodiments. Electric vehicle 100 may include inverter 110, motor 190, and battery 195. Inverter 110 may include an inverter controller 300 (shown in FIG. 3) to control the inverter 110. Inverter 110 may include a low voltage upper phase controller 120 separated from a high voltage upper phase controller 130 by a galvanic isolator 150, and an upper phase power module 140. Upper phase power module 140 may include a point-of-use upper phase controller 142 and upper phase switches 144. Inverter 110 may include a low voltage lower phase controller 125 separated from a high voltage lower phase controller 135 by galvanic isolator 150, and a lower phase power module 145. Lower phase power module 145 may include a point-of-use lower phase controller 146 and lower phase switches 148. Upper phase switches 144 and lower phase switches 148 may be connected to motor 190 and battery 195. Galvanic isolator 150 may be one or more of optical, transformer-based, or capacitance-based isolation. Galvanic isolator 150 may be one or more capacitors with a value from approximately 20 fF to approximately 100 fF, with a breakdown voltage from approximately 6 kV to approximately 12 kV, for example. Galvanic isolator 150 may include a pair of capacitors, where one capacitor of the pair carries a complementary data signal from the other capacitor of the pair to create a differential signal for common-mode noise rejection. Galvanic isolator 150 may include more than one capacitor in series. Galvanic isolator 150 may include one capacitor located on a first IC, or may include a first capacitor located on a first IC and a second capacitor located on a second IC that communicates with the first IC.

Inverter 110 may include a low voltage area, where voltages are generally less than 5V, for example, and a high voltage area, where voltages may exceed 500V, for example. The low voltage area may be separated from the high voltage area by galvanic isolator 150. Inverter controller 300 may be in the low voltage area of inverter 110, and may send signals to and receive signals from low voltage upper phase controller 120. Low voltage upper phase controller 120 may be in the low voltage area of inverter 110, and may send signals to and receive signals from high voltage upper phase controller 130. Low voltage upper phase controller 120 may send signals to and receive signals from low voltage lower phase controller 125. High voltage upper phase controller 130 may be in the high voltage area of inverter 110. Accordingly, signals between low voltage upper phase controller 120 and high voltage upper phase controller 130 pass through galvanic isolator 150. High voltage upper phase controller 130 may send signals to and receive signals from point-of-use upper phase controller 142 in upper phase power module 140. Point-of-use upper phase controller 142 may send signals to and receive signals from upper phase switches 144. Upper phase switches 144 may be connected to motor 190 and battery 195. Upper phase switches 144 and lower phase switches 148 may be used to transfer energy from motor 190 to battery 195, from battery 195 to motor 190, from an external source to battery 195, or from battery 195 to an external source, for example. The lower phase system of inverter 110 may be similar to the upper phase system as described above.

Figure 3:
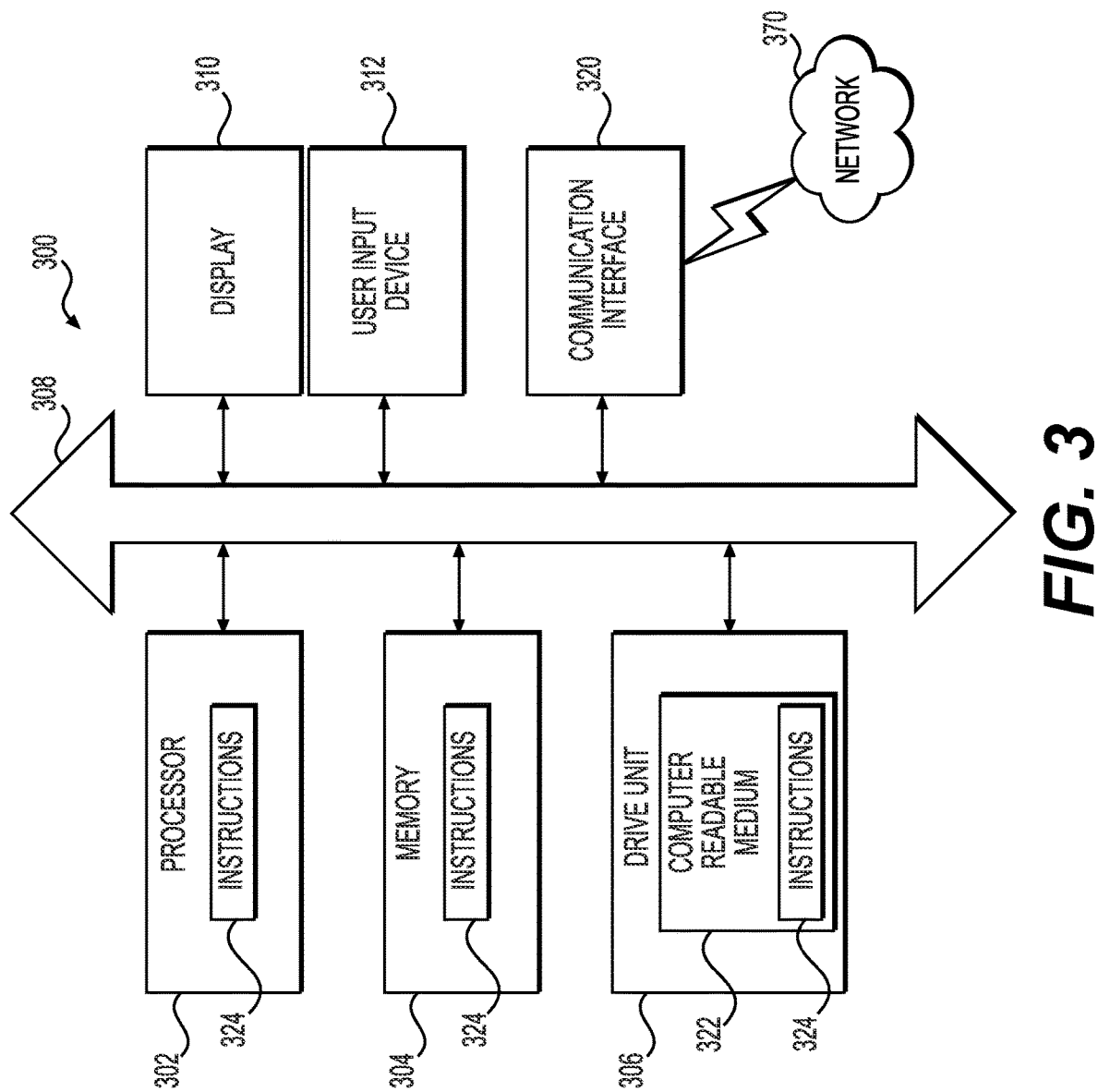
FIG. 3 depicts an exemplary system infrastructure for the controller of FIG. 2, according to one or more embodiments.

FIG. 3 depicts an exemplary system infrastructure for inverter controller 300 of FIG. 2, according to one or more embodiments. Inverter controller 300 may include one or more controllers.

The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As shown in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which the instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component or object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
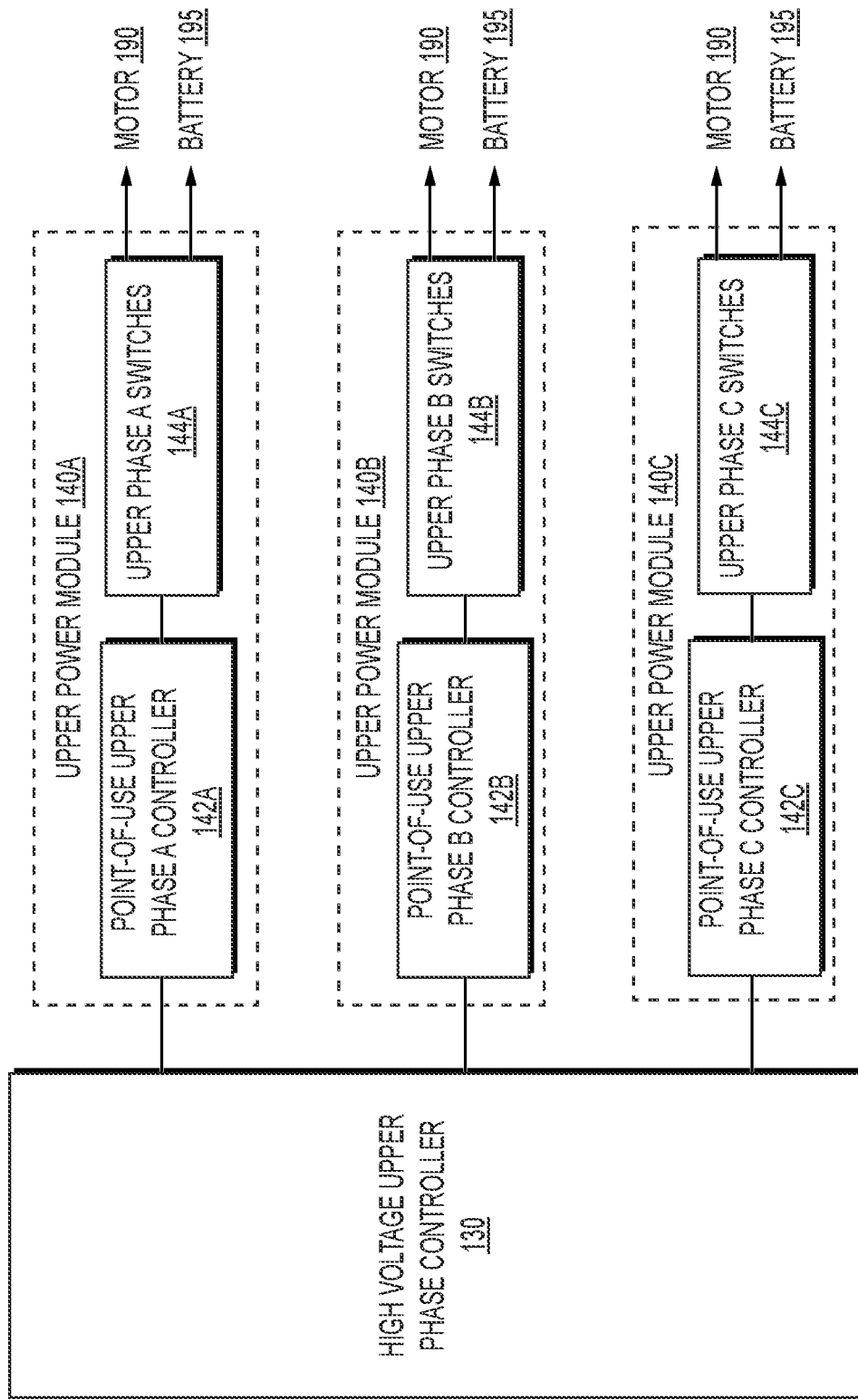
FIG. 4 depicts an exemplary system infrastructure for the point-of-use switch controller of FIG. 2, according to one or more embodiments.

FIG. 4 depicts an exemplary system infrastructure for the point-of-use switch controller of FIG. 2, according to one or more embodiments. For a three-phase inverter, each of the upper phase and the lower phase may include three phases correlating with phases A, B, and C. For example, upper phase power module 140 may include upper phase power module 140A for upper phase A, upper phase power module 140B for upper phase B, and upper phase power module 140C for upper phase C. Upper phase power module 140A may include point-of-use upper phase A controller 142A and upper phase A switches 144A. Upper phase power module 140B may include point-of-use upper phase B controller 142B and upper phase B switches 144B. Upper phase power module 140C may include point-of-use upper phase C controller 142C and upper phase C switches 144C. Each of the upper phase A switches 144A, upper phase B switches 144B, and upper phase C switches 144C may be connected to motor 190 and battery 195. FIG. 4 depicts details of the upper phase power module 140. Although not shown, the lower phase power module 145 may include a similar structure as the upper phase power module 140 for lower phases A, B, and C.

Figure 5:
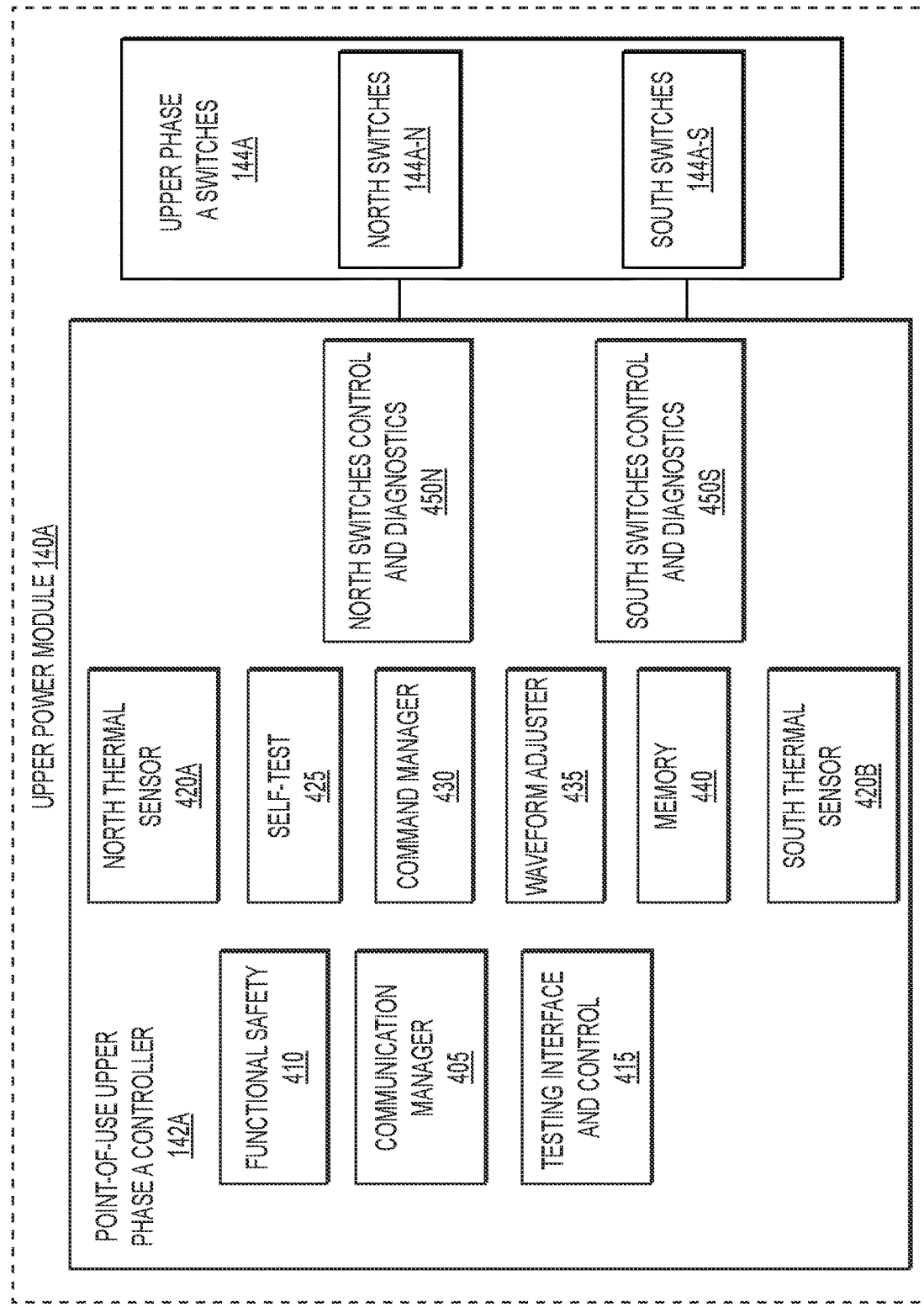
FIG. 5 depicts an exemplary system infrastructure for the upper power module of FIG. 4, according to one or more embodiments.

FIG. 5 depicts an exemplary system infrastructure for the upper power module of FIG. 4, according to one or more embodiments. For example, FIG. 5 provides additional details of upper phase power module 140A. Although not shown, upper phase power module 140B, upper phase power module 140C, and respective lower phase power modules of lower phase power module 145 may include a similar structure as the upper phase power module 140A shown in FIG. 5. Moreover, the terms upper, lower, north, and south used in the disclosure are merely for reference, do not limit the elements to a particular orientation, and are generally interchangeable throughout. For example, the upper phase power module 140 could be referred to a lower phase power module, a north phase power module, a south phase power module, a first phase power module, or a second phase power module.

Upper phase power module 140A may include point-of-use upper phase A controller 142A and upper phase A switches 144A. Upper phase A switches 144A may include one or more groups of switches. As shown in FIG. 5, upper phase A switches 144A may include upper phase A north switches 144A-N and upper phase A south switches 144A-S. Point-of-use upper phase A controller 142A may include one or more memories, controllers, or sensors. For example, point-of-use upper phase A controller 142A may include a communication manager 405, a functional safety controller 410, a testing interface and controller 415, a north thermal sensor 420A, a south thermal sensor 420B, a self-test controller 425, a command manager 430, a waveform adjuster 435, a memory 440, north switches control and diagnostics controller 450N, and south switches control and diagnostics controller 450S. Point-of-use upper phase A controller 142A may include more or less components than those shown in FIG. 5. For example, point-of-use upper phase A controller 142A may include more or less than two switch control and diagnostics controllers, and may include more than two thermal sensors.

Communication manager 405 may control inter-controller communications to and from point-of-use upper phase A controller 142A and/or may control intra-controller communications between components of point-of-use upper phase A controller 142A. Functional safety controller 410 may control safety functions of point-of-use upper phase A controller 142A. Testing interface and controller 415 may control testing functions of point-of-use upper phase A controller 142A, such as end-of-line testing in manufacturing, for example. North thermal sensor 420A may sense a temperature at a first location in point-of-use upper phase A controller 142A, and south thermal sensor 420B may sense a temperature at a second location in point-of-use upper phase A controller 142A. Self-test controller 425 may control a self-test function of point-of-use upper phase A controller 142A, such as during an initialization of the point-of-use upper phase A controller 142A following a power on event of inverter 110, for example. Command manager 430 may control commands received from communication manager 405 issued to the north switches control and diagnostics controller 450N and south switches control and diagnostics controller 450S. Waveform adjuster 435 may control a waveform timing and shape of commands received from communication manager 405 issued to the north switches control and diagnostics controller 450N and south switches control and diagnostics controller 450S. Memory 440 may include one or more volatile and non-volatile storage media for operation of point-of-use upper phase A controller 142A. North switches control and diagnostics controller 450N may send one or more signals to north switches 144A-N to control an operation of north switches 144A-N, and may receive one or more signals from north switches 144A-N that provide information about north switches 144A-N. South switches control and diagnostics controller 450S may send one or more signals to south switches 144A-S to control an operation of south switches 144A-S, and may receive one or more signals from south switches 144A-S that provide information about south switches 144A-S. As stated above, the terms north and south are merely used for reference, and north switches control and diagnostics controller 450N may send one or more signals to south switches 144A-S, and south switches control and diagnostics controller 450S may send one or more signals to south switches 144A-N.

Figure 6:
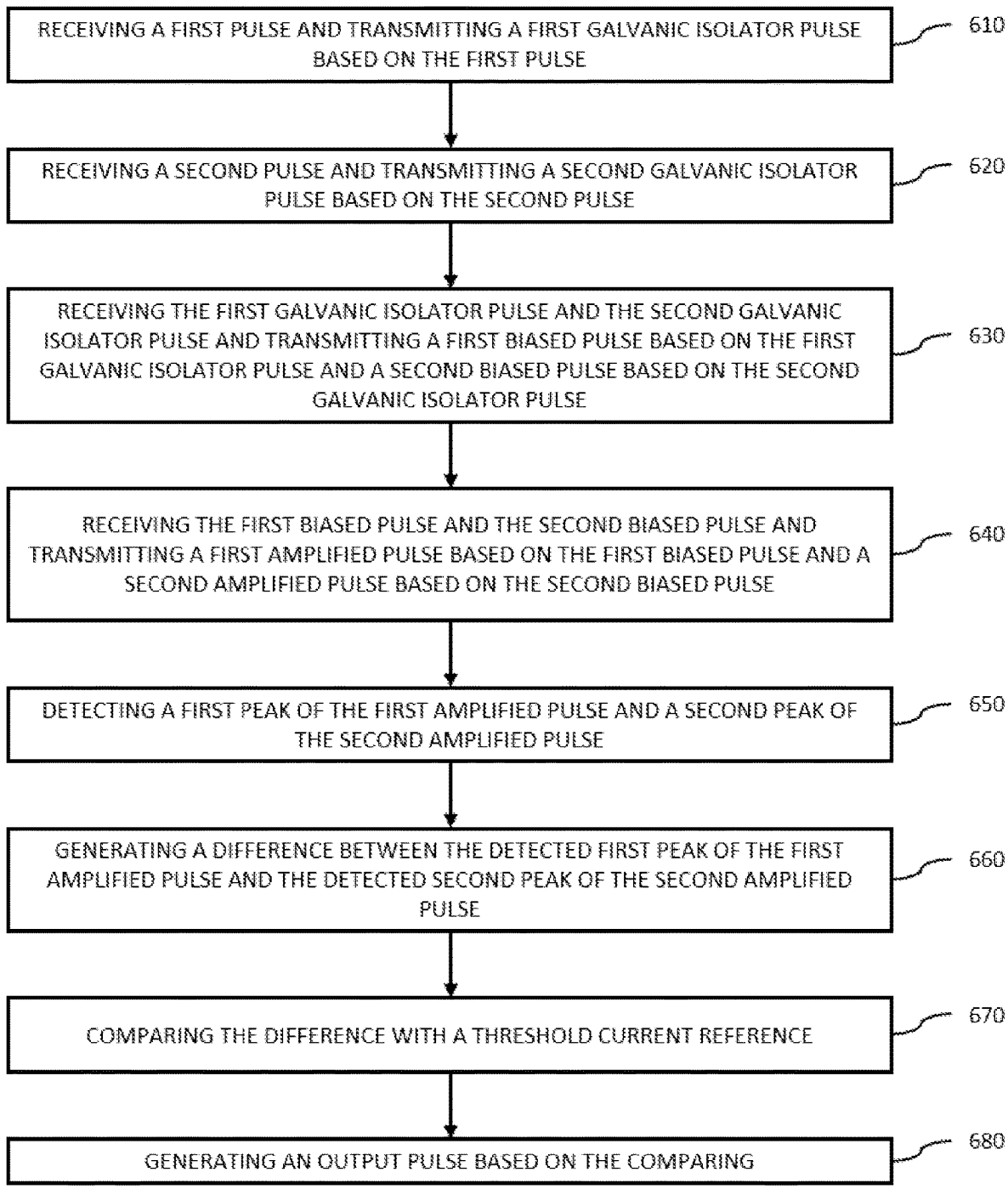
FIG. 6 depicts an exemplary method for open bond wire detection, according to one or more embodiments.

FIG. 6 depicts an exemplary method 600 for open bond wire detection across a galvanic interface. A pulse transceiver (e.g., a controller transceiver) may generate a first pulse and a second pulse. The first pulse and second pulse may be based on a primary pulse. The first pulse and the second pulse may be generated based on, for example, a drain voltage and a PWM-in signal, relative to a ground signal. The first pulse and the second pulse may be generated by the pulse transceiver to control a gate device and/or to indicate that a subsequent control signal is to be received by the gate device. The gate device may be upper phase switches 144, for example. The pulse transceiver may be located at a low voltage section of an electrical system. For example, with reference to FIG. 2, low voltage upper phase controller 120 may receive a PWM-in signal including a primary pulse from inverter controller 300, and may generate a first pulse and a second pulse based on the received primary pulse.

Exemplary method 600 may include receiving, by one or more controllers, a first pulse, and transmitting, by the one or more controllers, a first galvanic isolator pulse based on the first pulse (operation 610). Exemplary method 600 may include receiving, by the one or more controllers, a second pulse, and transmitting by the one or more controllers, a second galvanic isolator pulse based on the second pulse (operation 620). Exemplary method 600 may include receiving, by the one or more controllers, the first galvanic isolator pulse and the second galvanic isolator pulse and transmitting by the one or more controllers, a first biased pulse based on the first galvanic isolator pulse and a second biased pulse based on the second galvanic isolator pulse (operation 630).

Exemplary method 600 may include receiving, by the one or more controllers, the first biased pulse and the second biased pulse and transmitting by the one or more controllers, a first amplified pulse based on the first biased pulse and a second amplified pulse based on the second biased pulse (operation 640). Exemplary method 600 may include detecting, by the one or more controllers, a first peak of the first amplified pulse and a second peak of the second amplified pulse (operation 650).

Exemplary method 600 may include generating, by the one or more controllers, a difference between the detected first peak of the first amplified pulse and the detected second peak of the second amplified pulse (operation 660). Exemplary method 600 may include comparing, by the one or more controllers, the difference with a threshold current reference (operation 670). Exemplary method 600 may include generating, by the one or more controllers, an output pulse based on the comparing (operation 680).

The first pulse and the second pulse generated at the pulse transceiver may be complementary (e.g. phase shifted by 180 degrees) signals of each other, for example. The first pulse and the second pulse may be transmitted via two different electrical paths, including a first path for the first pulse and a second path for the second pulse. A first pulse may be received at a first galvanic isolator via the first path, and a second pulse may be received at a second galvanic isolator via the second path. The first path and/or the first galvanic isolator may be physically separated from the second path and/or the second galvanic isolator.

A first galvanic isolator pulse may be output from the first galvanic isolator and received at a first bias network, and a second galvanic isolator pulse may be output from the second galvanic isolator and may be received at a second bias network. The first bias network and second bias network may include approximately the same circuitry. Accordingly, the first galvanic isolator pulse and the second galvanic isolator pulse may pass through approximately the same circuitry via the first bias network and the second bias network, respectively. Alternatively, the first bias network and the second bias network may include different components, or the same or similar components configured differently.

The first bias network may process the first galvanic isolator pulse, and the second bias network may process the second galvanic isolator pulse based on one or more bias network properties. For example, the first bias network and/or second bias network may set direct current (DC) operating conditions (e.g., current and/or voltage) of the first galvanic isolator pulse and the second galvanic isolator pulse, respectively. The first bias network and/or second bias network may include one or more electronic components such as, but not limited to, one or more diodes, or one or more transistors, for example, which may process the first galvanic isolator pulse and second galvanic isolator pulse, respectively. The first bias network may output a first biased pulse corresponding to the first galvanic isolator pulse, and the second bias network may output a second biased pulse corresponding to the second galvanic isolator pulse.

The first biased pulse may be provided to a first amplifier. The second biased pulse may be provided to a second amplifier. The first amplifier and the second amplifier may amplify the first biased pulse and the second biased pulse, respectively, based on one or more amplifier properties. For example, the first amplifier and the second amplifier may increase the voltage, current, and/or power of the first biased pulse and the second biased pulse, respectively.

The first amplifier may output a first amplified pulse corresponding to the first biased pulse, and the second amplifier may output a second amplified pulse corresponding to the second biased pulse. Each of the first amplified pulse and the second amplified pulse may be provided to an open detector. The open detector may include one or more electrical components to compare signal properties of the first amplified pulse with signal properties of the second amplified pulse. For example, the open detector may compare one or more of amplitudes, frequencies, or phases of the first amplified pulse and the second amplified pulse. The open detector may also be referred to as an open wire bond detector or an open connection detector, for example.

The open detector may detect a first peak of the first amplified pulse and a second peak of the second amplified pulse. The peak of the pulses, or signals, may be a maximum value of the signal within a period of the signal. The first peak and the second peak may be held and smoothed using a low-pass filter, for example.

The open detector may generate a difference between the detected first peak of the first amplified pulse and the detected second peak of the second amplified pulse. For example, the open detector may subtract the detected second peak of the second amplified pulse from the detected first peak of the first amplified pulse, as a first difference. Similarly, the open detector may subtract the detected first peak of the first amplified pulse from the detected second peak of the second amplified pulse, as a second difference.

The open detector may compare one or more of the first difference or the second difference to a threshold value to determine whether the difference in signal properties of the first amplified pulse and the signal properties of the second amplified pulse is within a threshold difference. When a difference in signal properties of the first amplified pulse and the signal properties of the second amplified pulse is below the threshold difference, the open detector may take a first mitigation action. The first mitigation action may include outputting a first match signal (e.g., a confirmed match signal) indicating that the first amplified pulse and the second amplified pulse are below the threshold difference. The first mitigation action may include taking no action. The first mitigation action may include causing an electrical component to accept or otherwise pass through the first pulse and/or the second pulse to one or more electrical components.

Alternatively, when the difference in signal properties of the first amplified pulse and the signal properties of the second amplified pulse is above the threshold difference, then the open detector may take a second mitigation action, the second mitigation action being different from the first mitigation action. The second mitigation action may include, for example, outputting a second match signal (e.g., a no match signal) indicating that the first amplified pulse and the second amplified pulse are above the threshold difference. The second mitigation action may include causing an electrical component to discard or otherwise ignore the first pulse and/or the second pulse.

Accordingly, the mitigation action may be a pass-through action such that the open detector may cause an output of the first pulse and/or second pulse. Alternatively, the mitigation action may cause the open detect logic to hold (e.g., via hysteresis) or prevent outputting the first pulse and the second pulse when the difference between the first amplified pulse and the second amplified pulse is above a threshold difference. In this scenario, according to one or more embodiments, the open detector may cause the first pulse and/or the second pulse to be discarded such that the first pulse and the second pulse are not used to generate an output (e.g., a PWM out signal) via one or more electrical components. In this example, a previous output (e.g., a previous PWM out signal) may be held or maintained until a mitigation action occurs or until the difference between a subsequent first amplified pulse and subsequent second amplified pulse are below the threshold.

It will be understood that any operation (e.g., such as those disclosed in reference to FIG. 6) disclosed herein are not limited to be performed any specific order or sequence. Any order or sequence disclosed herein is only disclosed as an example, and one or more of the operations (e.g., of a given process) may be performed in any applicable manner, as understood by one skilled in the art.

Figure 7:
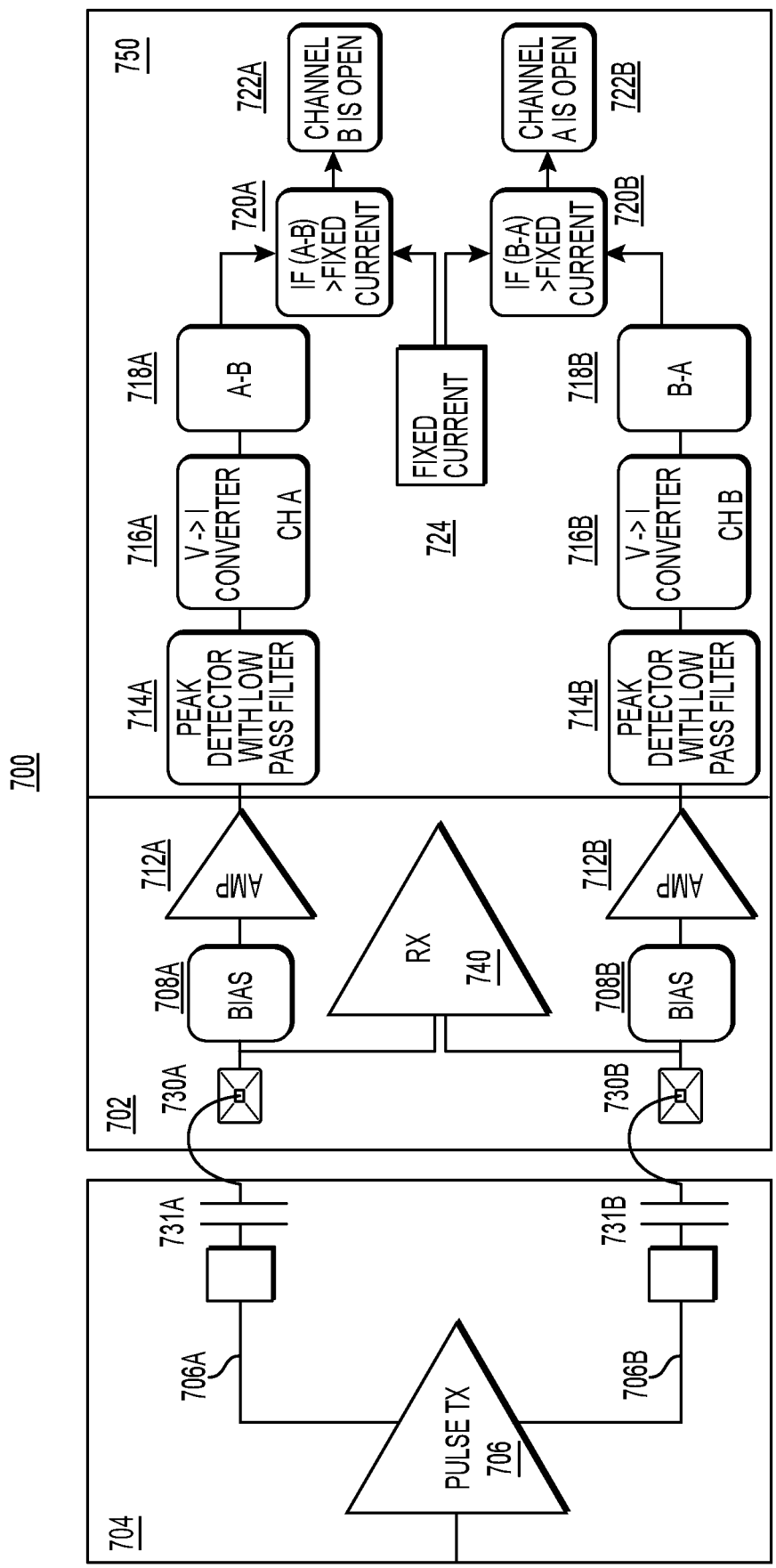
FIG. 7 depicts an exemplary system infrastructure for an open bond wire detector for a galvanic interface, according to one or more embodiments.

Accordingly, the techniques disclosed in the exemplary method 600 of FIG. 6 and the architecture described in controller 700 of FIG. 7 may be used to mitigate or prevent use of pulses that may be modified from interference. The parallel pulse signals disclosed herein may be used to identify interference signals due to, for example, high voltage components. The identification of interference signals may be conducted based on common mode rejection. However, the common mode rejection may require absence of bond connection issues, as disclosed herein.

Accordingly, the techniques disclosed in the exemplary method 600 of FIG. 6 and the architecture described in controller 700 of FIG. 7 may be used to determine a bond connection issue (e.g., open bonds, loose connections, etc.) across a galvanic interface. By ensuring an absence of such bond connection issues, the parallel pulses used herein may be validated for interference detection (e.g., using common mode rejection). These techniques may prevent or mitigate unwanted effects of CMRFI, for example.

These techniques may include comparing two parallel pulses generated by a pulse transceiver and received at a first galvanic isolator and a second galvanic isolator. The comparison may include determining differences between the two parallel pulses, where the two parallel pulses may be identical, similar, complementary, or inverse, when generated at the pulse transceiver. Bond connection issue (e.g., open bonds, loose connections, etc.) across a galvanic interface may cause signal properties for the two parallel pulses to be different (e.g., above a threshold amount), such that comparing the two parallel pulses, as disclosed herein, may identify the level of difference, if any. For example, an open bond connection or a highly resistive connection may result a difference above a threshold amount when comparing the first and second amplified pulses discussed herein. When differences above a threshold difference are detected, a determination may be made that a bond connection issue exists.

Accordingly, bond connection issues in the presence of CMRFI may be solved by amplifying the signal paths, of two parallel pulses, separately, followed by detecting operations. Detection of bond connection issues may be conducted in a continuous manner, during operation of a controller (e.g., during a mission or operational mode) such that each first and second pulse, as disclosed herein, is analyzed for such bond connection issues prior to or in parallel to being passed through a main receiver. By detecting such bond connection issues for each first and second pulse during continued operation of a circuit, delays in such bond connection detection may be mitigated, preventing unwanted use of signals effected via interference. The open detector may accurately compare the first and second amplified signals disclosed herein, without deviations from noise interference. Although the bias networks and main receiver disclosed herein may be the same or similar, placement of the open capacitor detection circuit (e.g., the first and second bias networks, the first and second amplifier, and/or the open detector) before or in parallel to the main receiver result in operations that are more immune to common mode RF coupling.

FIG. 7 depicts an exemplary system infrastructure for an open bond wire detector for a galvanic interface, according to one or more embodiments. With reference to FIG. 2, controller 700 may be an implementation of low voltage upper phase controller 120 and high voltage upper phase controller 130, for example. As shown in FIG. 7, controller 700 may include a low voltage area 702 and a high voltage area 704. Low voltage area 702 and high voltage area 704 may be implementations of low voltage upper phase controller 120 and high voltage upper phase controller 130, respectively. The low voltage area 702 may include, be connected to, or be otherwise associated with low voltage components relative to high voltage area 704. Low voltage area 702 may be referenced herein as a primary area and high voltage area 704 may be referenced herein as a secondary area. High voltage area 704 may include a pulse transceiver 706. Open bond wire detector may be provided on one or more of the low voltage area 702 and the high voltage area 704. For example, low voltage area 702 may include an open bond wire detector to monitor signals received from high voltage area 704, and high voltage area 704 may include an open bond wire detector to monitor signals received from low voltage area 702.

Pulse transceiver 706 may include one or more electrical components configured to receive a signal including a primary pulse, based on a drain voltage VDDL (not shown), a PWM-in signal (not shown), and/or a reference ground GNDL (not shown). PWM-in signal may be generated by inverter controller 300, for example. Pulse transceiver 706 may include one or more electrical components configured to output parallel pulses, based on the primary pulse. Pulse transceiver 706 may be configured to output the parallel pulses via a first pulse transceiver output path 706A and a second pulse transceiver output path 706B. Accordingly, pulse transceiver 706 may output a first pulse of the parallel pulses via first pulse transceiver output path 706A and a second pulse of the parallel pulses via second pulse transceiver output path 706B.

The first pulse may be received at a first galvanic isolator 731A and first wire bond 730A and the second pulse may be received by a second galvanic isolator 731B and second wire bond 730B. First galvanic isolator 731A and second galvanic isolator 731B may be implementations of galvanic isolator 150, for example. First wire bond 730A and/or the first galvanic isolator 731A may be physically separated from second wire bond 730B and/or the second galvanic isolator 731B. First galvanic isolator 731A and/or second galvanic isolator 731B may positioned on high voltage area 704 and may be configured for an operational voltage of up to approximately 5000 volts, for example, or higher voltages.

First galvanic isolator 731A may output a first galvanic isolator pulse, and second galvanic isolator 731B may output a second galvanic isolator pulse. The first galvanic isolator pulse may be received at a first bias network 708A, and the second galvanic isolator pulse may be received at a second bias network 708B. First bias network 708A and second bias network 708B may include approximately the same circuitry. Alternatively, according to an embodiment, first bias network 708A and second bias network 708B may include different components, the same or similar components configured differently, or the like.

First bias network 708A may process the first galvanic isolator pulse and second bias network 708B may process the second galvanic isolator pulse based on one or more bias network properties. For example, first bias network 708A and/or second bias network 708B may set direct current (DC) operating conditions (e.g., current and/or voltage) of the first galvanic isolator pulse and the second galvanic isolator pulse, respectively. First bias network 708A and/or second bias network 708B may include one or more electronic components such as, but not limited to, one or more diodes, one or more transistors, one or more vacuum tubes, etc., which may process the first galvanic isolator pulse and second galvanic isolator pulse, respectively. First bias network 708A and/or second bias network 708B may create proper input impedances and biasing values for both paths, to minimize the common-mode noise amplitude and to equalize a remaining residual value to reduce effects on signal detection integrity.

First bias network 708A may output a first biased pulse corresponding to the first galvanic isolator pulse via a first bias network output path, and second bias network 708B may output a second biased pulse corresponding to the second galvanic isolator pulse via a second bias network output path. The first biased pulse may be provided to a first amplifier 712A. The second biased pulse may be provided to a second amplifier 712B. First amplifier 712A and second amplifier 712B may amplify the first biased pulse and the second biased pulse, respectively, based on one or more amplifier properties. For example, first amplifier 712A and second amplifier 712B may increase the voltage, current, and/or power of the first biased pulse and the second biased pulse, respectively.

First amplifier 712A may output a first amplified pulse corresponding to the first biased pulse via a first amplifier output path, and second amplifier 712B may output a second amplified pulse corresponding to the second biased pulse via a second amplifier output path. Each of the first amplified pulse and the second amplified pulse may be provided to an open detector 750. First amplifier 712A and second amplifier 712B may increase the voltage, current, and/or power of the first biased pulse and the second biased pulse, respectively, for detection by open detector 750. For example, first amplifier 712A and second amplifier 712B may increase the voltage, current, and/or power of the first biased pulse and the second biased pulse with a gain of 10.

Open detector 750 may include first peak detector 714A, second peak detector 714B, first voltage-to-current converter 716A, second voltage-to-current converter 716B, first difference generator 718A, second difference generator 718B, first comparator 720A, second comparator 720B, first output 722A, second output 722B, and threshold current reference 724.

First peak detector 714A may hold a peak of the first amplified pulse for a duration of time. First peak detector 714A may include a low pass filter to smooth a first peak voltage with respect to the held first amplified pulse. First voltage-to-current converter 716A may convert the output, the smoothed first peak voltage, of the first peak detector 714A from a first voltage signal to a first current signal. Second peak detector 714B may hold a peak of the second amplified pulse for a duration of time. Second peak detector 714B may include a low pass filter to smooth a second peak voltage with respect to the held second amplified pulse. Second voltage-to-current converter 716B may convert the output, the smoothed second peak voltage, of the second peak detector 714B from a second voltage signal to a second current signal.

First peak detector 714A and second peak detector 714B may be positive or negative peak detectors that hold a highest or lowest input signal for a programmable duration, such as 50 ns, for example. First peak detector 714A and second peak detector 714B may be a circuit with an equivalent RC network at an output stage, which may contain ripples depending on the data rate and/or hold duration. The low pass filter may be an RC circuit, and may be any order to reduce these ripples. The low pass filter may avoid the need for a comparator with a large hysteresis range.

First difference generator 718A may subtract the second current signal of second voltage-to-current converter 716B from the first current signal of first voltage-to-current converter 716A, as a first difference. First comparator 720A may compare the first difference to threshold current reference 724, and if the first difference is greater than threshold current reference 724, first comparator 720A may assert first output 722A, indicating an open bond wire for the second galvanic isolator pulse. For example, a difference of 200 mV between the outputs of first peak detector 714A and second peak detector 714B may generate a first difference of more than 50 pA, and may indicate an open bond wire. These values may be programmable and may be changed depending on the amplitude of an input signal. When both bond wires are intact, the difference between the outputs of first peak detector 714A and second peak detector 714B may be less than 30 mV.

Second difference generator 718B may subtract the first current signal of first voltage-to-current converter 716A from the second current signal of second voltage-to-current converter 716B, as a second difference. Second comparator 720B may compare the second difference to threshold current reference 724, and if the second difference is greater than threshold current reference 724, second comparator 720B may assert second output 722B, indicating an open bond wire for the first galvanic isolator pulse.

Open detector 750 may include one or more electrical components to compare signal properties of the first amplified trimmed pulse with signal properties of the second amplified trimmed pulse. For example, open detector 750 may compare one or more of amplitudes, frequencies, or phases of the first amplified trimmed pulse and the second amplified trimmed pulse. For example, open detector 750 may compare the first amplified pulse with respect to a reference signal, while simultaneously comparing the second amplified pulse with respect to another reference signal to determine an open wire-bond fault.

Open detector 750 may determine whether the difference in signal properties of the first amplified pulse and the signal properties of the second amplified pulse is within a threshold difference. When a difference in signal properties of the first amplified pulse and the signal properties of the second amplified pulse is below the threshold difference, open detector 750 may take a first mitigation action. The first mitigation action may include outputting a first match signal (e.g., a confirmed match signal) indicating that the first amplified pulse and the second amplified pulse are below the threshold difference. The first mitigation action may include taking no action. The first mitigation action may include causing an electrical component to accept or otherwise pass through the first pulse and/or the second pulse to one or more electrical components.

Alternatively, when the difference in signal properties of the first amplified pulse and the signal properties of the second amplified pulse is above the threshold difference, then the open detector 750 may take a second mitigation action, the second mitigation action being different from the first mitigation action. The second mitigation action may include, for example, outputting a second match signal (e.g., a no match signal) indicating that the first amplified pulse and the second amplified pulse are above the threshold difference. The second mitigation action may include causing an electrical component to discard or otherwise ignore the first pulse and/or the second pulse.

As shown in FIG. 7, first bias network 708A, first amplifier 712A, second bias network 708B, second amplifier 712B, and open detector 750 may be provided in parallel with main receiver 740. In this configuration, main receiver 740 may receive signals from first galvanic isolator 731A and second galvanic isolator 731B in parallel with the open detector 750 components. Accordingly, open detector 750 may perform an open wire bond detection with no direct effect on main receiver 740. Open detector 750 may perform an open wire bond detection while main receiver 740 is operating in a mission mode, for example, during an operation of inverter 110. Open detector 750 may assert a fault signal when an open wire bond is detected, which may be used to control the operation of inverter 110.

Figure 8:
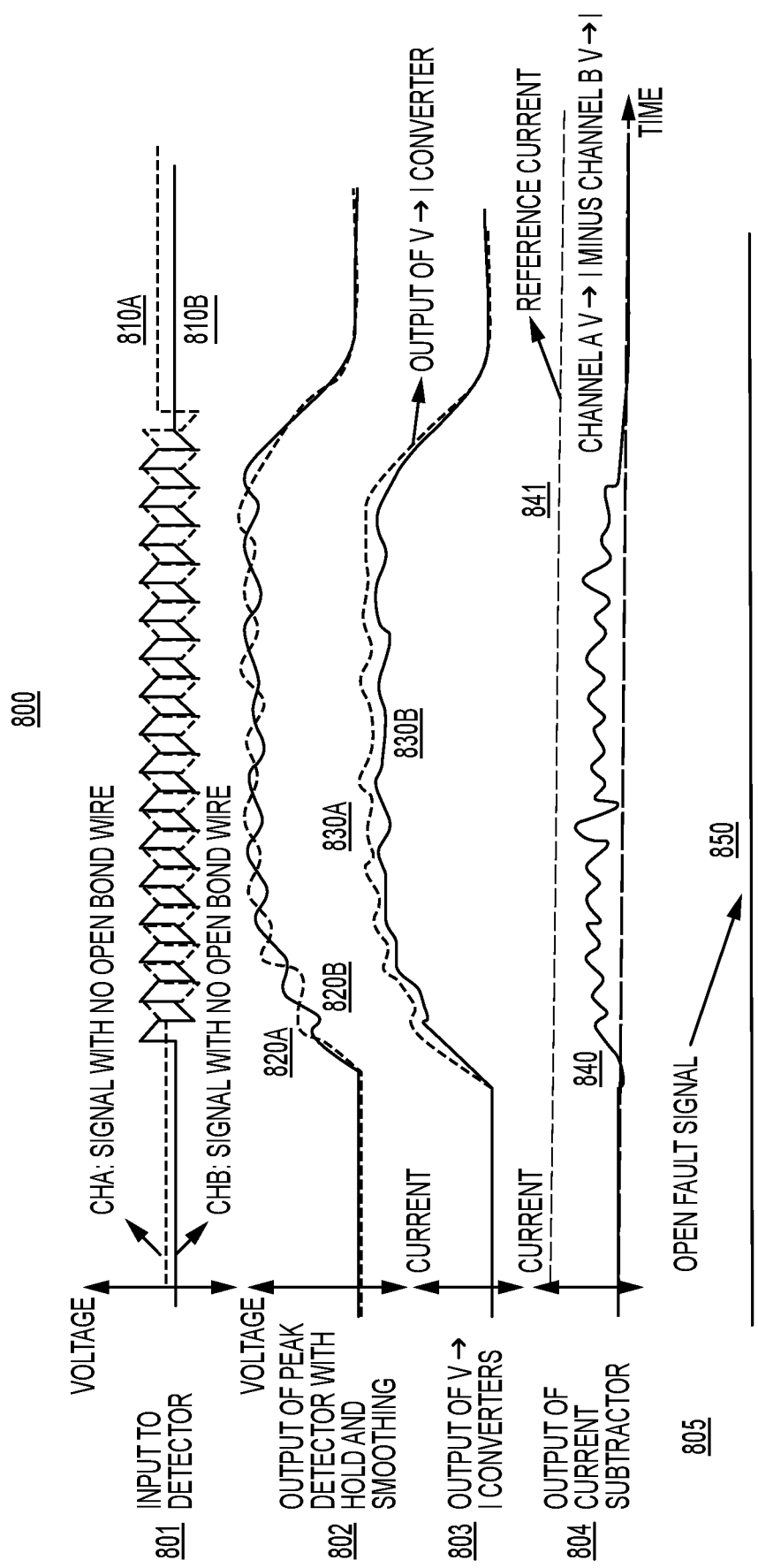
FIG. 8 depicts an exemplary plot for signal detection with no open bond wire for an open bond wire detector for a galvanic interface, according to one or more embodiments.

FIG. 8 depicts an exemplary plot 800 for signal detection with no open bond wire for an open bond wire detector for a galvanic interface, according to one or more embodiments. Exemplary plot 800 depicts an input 801 to open detector 750, which may be a first amplified signal 810A and a second amplified signal 810B. Output 802 depicts first amplified signal 810A and a second amplified signal 810B after passing through a peak detector with a hold and smoothing function, as first peak signal 820A and second peak signal 820B. Output 803 depicts first peak signal 820A and second peak signal 820B after passing through a voltage-to-current converter, as first converted signal 830A and second converted signal 830B.

Output 804 depicts an output of a difference generator, where second converted signal 830B is subtracted from first converted signal 830A, as difference signal 840. Open detector 750 may compare the difference signal 840 with reference current 841. Because the difference signal 840 is less than reference current 841, open detector 750 may provide an output 805 as a "no fault" signal 850, indicating that second amplified signal 810B does not have an open bond wire.

Figure 9:
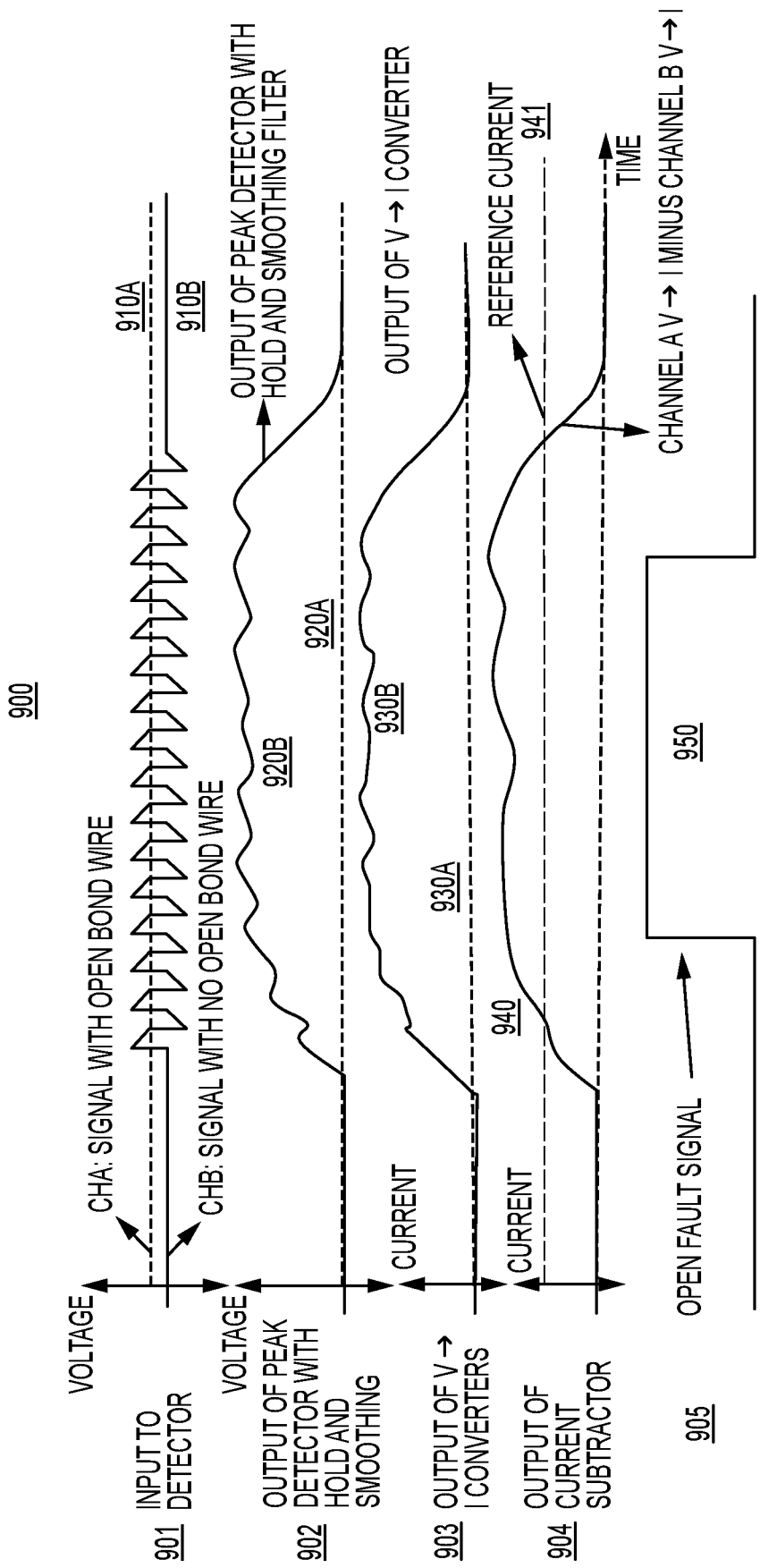
FIG. 9 depicts an exemplary plot for signal detection with an open bond wire for an open bond wire detector for a galvanic interface, according to one or more embodiments.

FIG. 9 depicts an exemplary plot 900 for signal detection with an open bond wire for an open bond wire detector for a galvanic interface, according to one or more embodiments. Exemplary plot 900 depicts an input 901 to open detector 750, which may be a first amplified signal 910A and a second amplified signal 910B. As shown in FIG. 9, a value of first amplified signal 910A is not changing while a value of second amplified signal 910B continues to change. Output 902 depicts first amplified signal 910A and a second amplified signal 910B after passing through a peak detector with a hold and smoothing function, as first peak signal 920A and second peak signal 920B. Output 903 depicts first peak signal 920A and second peak signal 920B after passing through a voltage-to-current converter, as first converted signal 930A and second converted signal 930B.

Output 904 depicts an output of a difference generator, where second converted signal 930B is subtracted from first converted signal 930A, as difference signal 940. Open detector 750 may compare the difference signal 940 with reference current 941. Because the difference signal 940 is more than reference current 941, open detector 750 may provide an output 905 as a fault signal 950, indicating that first amplified signal 910A has an open bond wire. Additionally, open detector 750 may require the difference signal 940 to be more than reference current 941 for a threshold duration of time before the fault signal 950 is asserted, so that small duration errors do not result in a fault.

One or more embodiments may provide a bias network for a receiver, with placement of an open cap detection circuit before the main receiver, which may increase an immunity of the circuit to common mode RF noise coupling. One or more embodiments may provide a system to detect an open bond wire during mission mode in the presence of CMRFI, which may provide a faster fault response time. One or more embodiments may provide a system that may use significantly less circuit area, and may not require a special test procedure or mode to detect the integrity of a bond wire.

One or more embodiments do not include a filter prior to amplification to remove noise, as such a filter may be complicated or might require multiple stages of filtering and/or amplification. One or more embodiments do not require any dedicated filtering and detects an open bond wire under any noise condition. One or more embodiments may provide an open wire bond detector that operates under different noise characteristics and for multiple designs.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A system comprising:
an inverter configured to convert DC power from a battery to AC power, wherein the inverter includes:

a first galvanic isolator separating a primary voltage area from a secondary voltage area, the first galvanic isolator having a first galvanic isolator output path;
a second galvanic isolator separating the primary voltage area from the secondary voltage area, the second galvanic isolator having a second galvanic isolator output path;
a first bias network in the secondary voltage area, and connected to the first galvanic isolator via the first galvanic isolator output path, the first bias network having a first bias network output path;
a second bias network in the secondary voltage area, and connected to the second galvanic isolator via the second galvanic isolator output path, the second bias network having a second bias network output path;
a first amplifier in the secondary voltage area, and connected to the first bias network via the first bias network output path, the first amplifier having a first amplifier output path;
a second amplifier in the secondary voltage area, and connected to the second bias network via the second bias network output path, the second amplifier having a second amplifier output path;
an open connection detector in the secondary voltage area, the open connection detector connected to the first amplifier via the first amplifier output path and connected to the second amplifier via the second amplifier output path,
wherein the open connection detector includes one or more voltage-to-current converters, and
wherein the inverter does not include a noise filter between the first galvanic isolator and the first amplifier, or between the second galvanic isolator and the second amplifier.

2. The system of claim 1, further comprising:
a pulse transceiver in the primary voltage area, the pulse transceiver connected to the first galvanic isolator via a first pulse transceiver output path and connected to the second galvanic isolator via a second pulse transceiver output path.

3. The system of claim 2, further comprising a main receiver.

4. The system of claim 3, wherein the pulse transceiver and the main receiver are configured to operate together to transmit a Pulse Width Modulation signal from the primary voltage area to the secondary voltage area.

5. The system of claim 2, wherein the pulse transceiver is configured to output a first pulse on the first pulse transceiver output path and a second pulse on the second pulse transceiver output path.

6. The system of claim 5, wherein the pulse transceiver is further configured to receive a primary pulse, and output the first pulse and the second pulse, based on the received primary pulse.

7. The system of claim 5, wherein:
the first galvanic isolator is configured to receive the first pulse on the first pulse transceiver output path, and send a first galvanic isolator pulse on the first galvanic isolator output path based on the received first pulse, and
the second galvanic isolator is configured to receive the second pulse on the second pulse transceiver output path, and send a second galvanic isolator pulse on the second galvanic isolator output path based on the received second pulse.

8. The system of claim 7, wherein:
the first bias network is configured to receive the first galvanic isolator pulse on the first galvanic isolator output path, process the first galvanic isolator pulse based on one or more properties of the first bias network, and send a first biased pulse on the first bias network output path based on the processed first galvanic isolator pulse, and
the second bias network is configured to receive the second galvanic isolator pulse on the second galvanic isolator output path, process the second galvanic isolator pulse based on one or more properties of the second bias network, and send a second biased pulse on the second bias network output path based on the processed second galvanic isolator pulse.

9. The system of claim 1, wherein the open connection detector includes:
a first peak detector connected to the first amplifier via the first amplifier output path, the first peak detector having a first peak detector output path, and
a second peak detector connected to the second amplifier via the second amplifier output path, the second peak detector having a second peak detector output path.

10. The system of claim 9, wherein the one or more voltage-to-current converters includes:
a first voltage-to-current converter connected to the first peak detector via the first peak detector output path, the first voltage-to-current converter having a first voltage-to-current converter output path, and
a second voltage-to-current converter connected to the second peak detector via the second peak detector output path, the second voltage-to-current converter having a second voltage-to-current converter output path.

11. The system of claim 10, wherein the open connection detector further includes:
a first difference detector connected to the first voltage-to-current converter via the first voltage-to-current converter output path, the first difference detector having a first difference detector output path, and
a second difference detector connected to the second difference detector via the second difference detector output path, the second difference detector having a second difference detector output path.

12. The system of claim 1, wherein the open connection detector is configured to:
receive a first amplified signal via the first amplifier output path;
receive a second amplified signal via the second amplifier output path;
perform a comparison of the first amplified signal and the second amplified signal, with one or more of each other or one or more reference signals; and
initiate a mitigation action based on the comparison of the first amplified signal and the second amplified signal.

13. The system of claim 12, wherein the mitigation action includes asserting a fault signal.

14. The system of claim 1, further comprising:
the battery configured to supply the DC power to the inverter; and
a motor configured to receive the AC power from the inverter to drive the motor.

15. A method comprising:
receiving, by one or more controllers, a first pulse, and transmitting, by the one or more controllers, a first galvanic isolator pulse based on the first pulse;

receiving, by the one or more controllers, a second pulse, and transmitting by the one or more controllers, a second galvanic isolator pulse based on the second pulse;

receiving, by the one or more controllers, the first galvanic isolator pulse and the second galvanic isolator pulse and transmitting by the one or more controllers, a first biased pulse based on the first galvanic isolator pulse and a second biased pulse based on the second galvanic isolator pulse;

receiving, by the one or more controllers, the first biased pulse and the second biased pulse and transmitting by the one or more controllers, a first amplified pulse based on the first biased pulse and a second amplified pulse based on the second biased pulse;

detecting, by the one or more controllers, a first peak of the first amplified pulse and a second peak of the second amplified pulse;

generating, by the one or more controllers, a difference between the detected first peak of the first amplified pulse and the detected second peak of the second amplified pulse;

comparing, by the one or more controllers, the difference with a threshold current reference; and generating, by the one or more controllers, an output pulse based on the comparing, wherein the generating the difference includes:
converting the detected first peak of the first amplified pulse from a voltage signal to a current signal;
converting the detected second peak of the second amplified pulse from a voltage signal to a current signal;
subtracting the converted second peak of the second amplified pulse from the converted first peak of the first amplified pulse, as a first difference; and
subtracting the converted first peak of the first amplified pulse from the converted second peak of the second amplified pulse, as a second difference.

16. The method of claim 15, wherein the comparing the difference with the threshold current reference includes:

determining whether the first difference is greater than the threshold current reference; and
determining whether the second difference is greater than the threshold current reference.

17. The method of claim 15, wherein the generating the output pulse includes:
generating an open bond wire for the second galvanic isolator pulse when the first difference is determined to be greater than the threshold current reference, and
generating an open bond wire for the first galvanic isolator pulse when the second difference is determined to be greater than the threshold current reference.

18. A system comprising:
a first galvanic isolator configured to receive a first pulse from a pulse transceiver and output a first galvanic isolator pulse based on the received first pulse;
a second galvanic isolator configured to receive a second pulse from the pulse transceiver and generate a second galvanic isolator pulse based on the received second pulse; and
one or more controllers configured to:
receive the first galvanic isolator pulse and the second galvanic isolator pulse as a first voltage signal and a second voltage signal,
convert the first voltage signal and the second voltage signal to a first current signal and a second current signal,
perform a comparison of the first current signal and the second current signal, with one or more of each other or one or more reference signals, and
determine a fault in one or more of the first galvanic isolator or the second galvanic isolator based on the comparison,
wherein the one or more controllers are further configured to perform the comparison of the first current signal and the second current signal by:
subtracting the second current signal from the first current signal, as a first difference; and
subtracting the first current signal from the second current signal, as a second difference.

* * * * *